(12) United States Patent
Rametta et al.

(10) Patent No.: US 10,654,328 B2
(45) Date of Patent: May 19, 2020

(54) TOW HITCH

(71) Applicants: Tony Rametta, Lalor (AU); Michael Rametta, Roxburgh Park (AU)

(72) Inventors: Tony Rametta, Lalor (AU); Michael Rametta, Roxburgh Park (AU)

(73) Assignee: AL-KO INTERNATIONAL PTY LIMITED, Dandenong South, Victoria (AU)

( * ) Notice: Subject to any disclaimer, the term of this patent is extended or adjusted under 35 U.S.C. 154(b) by 0 days.

(21) Appl. No.: 15/775,459

(22) PCT Filed: Nov. 14, 2016

(86) PCT No.: PCT/AU2016/000380
§ 371 (c)(1),
(2) Date: May 11, 2018

(87) PCT Pub. No.: WO2017/079785
PCT Pub. Date: May 18, 2017

(65) Prior Publication Data
US 2018/0354325 A1    Dec. 13, 2018

(30) Foreign Application Priority Data

Nov. 12, 2015    (AU) .................................. 2015904668

(51) Int. Cl.
*B60D 1/60*    (2006.01)
*B60D 1/06*    (2006.01)

(52) U.S. Cl.
CPC ................. *B60D 1/60* (2013.01); *B60D 1/06* (2013.01); *B60D 1/065* (2013.01)

(58) Field of Classification Search
CPC ....................................................... B60D 1/065
See application file for complete search history.

(56) References Cited

U.S. PATENT DOCUMENTS

| 2,363,755 | A | * | 11/1944 | Smith | ................... | B60D 1/065 |
| | | | | | | 280/512 |
| 2,523,500 | A | * | 9/1950 | Davey | ................... | B60D 1/065 |
| | | | | | | 280/513 |

(Continued)

FOREIGN PATENT DOCUMENTS

| EP | 0370225 A1 * | 5/1990 | ............. B60D 1/065 |
| GB | 717781 A | 11/1954 | |

(Continued)

*Primary Examiner* — Kevin Hurley
(74) *Attorney, Agent, or Firm* — King & Schickli, PLLC

(57) ABSTRACT

The invention relates to a lockable tow hitch. The tow hitch comprises a housing having a generally hemispheral socket for receiving a tow ball, and a handle mountable on the housing. The handle has having a rod member slidably projecting into the housing and arranged for moving a locking element within the housing between an engaged position at which it holds the tow ball within the socket and a disengaged position where the tow ball is free to move into and out of the socket. The tow hitch further comprises a catch member movable between a holding position wherein it secures the handle against sliding and an open position where the handle is free to slide, and a lock arranged to lock the locking element in the engaged position when the lock is locked, and to free the locking element for moving to the disengaged position when the lock is unlocked.

10 Claims, 8 Drawing Sheets

SECTION A-A

(56) References Cited

U.S. PATENT DOCUMENTS

| | | | | |
|---|---|---|---|---|
| 3,009,714 A | * | 11/1961 | Lamberson | B60D 1/065 280/512 |
| 4,817,979 A | | 4/1989 | Goettker | |
| 4,889,357 A | * | 12/1989 | Perry | B60D 1/66 280/475 |
| 5,725,232 A | | 3/1998 | Fleming | |
| 6,505,849 B1 | * | 1/2003 | Ebey | B60D 1/065 280/513 |
| 7,300,068 B1 | * | 11/2007 | Johnsen | B60D 1/065 280/507 |
| 7,413,212 B2 | * | 8/2008 | Hsai | B60D 1/065 280/506 |
| 7,461,856 B2 | * | 12/2008 | Goettker | B60D 1/065 280/513 |
| 7,690,673 B1 | * | 4/2010 | Kraai | B60D 1/60 280/507 |
| 8,444,169 B1 | * | 5/2013 | Katz | B60D 1/62 280/477 |
| 8,757,654 B2 | * | 6/2014 | Lachance | B60D 1/28 280/507 |
| 9,873,299 B2 | * | 1/2018 | Olson | B60D 1/065 |
| 2007/0175246 A1 | | 8/2007 | Hsai | |
| 2009/0302574 A1 | | 12/2009 | Columbia | |
| 2011/0241312 A1 | | 10/2011 | Goettker | |
| 2013/0001923 A1 | | 1/2013 | MacKarvich | |

FOREIGN PATENT DOCUMENTS

| | | |
|---|---|---|
| GB | 1011204 A | 11/1965 |
| GB | 1093054 A | 11/1967 |
| GB | 2506258 A | 3/2014 |

* cited by examiner

TOW HITCH

FIELD

The invention relates to a tow hitch design particularly a tow hitch which is lockable.

INCORPORATION BY REFERENCE

This application claims priority from Australian provisional application no 2015904668, the entire contents of which are hereby incorporated by reference.

BACKGROUND

Tow hitches of various designs have been used for many years by people wishing to tow caravans, trailers, etc. In broad form, tow hitches generally comprise a hemispherical socket which fits over a tow ball in a manner which allows the trailer or caravan attached to the tow hitch to be freely movable in orientation with respect to the towing vehicle to which the tow hitch is attached. Generally speaking, the tow hitch hemispherical component may be latched onto the tow ball by pushing the hemispherical component directly onto the tow ball and moving a locking element into place to ensure that the tow ball and tow hitch are secured together. Whilst such an arrangement is quite effective for towing, unfortunately there have been instances where unscrupulous persons have disengaged the locking element to remove the trailer from the towing vehicle in order to steal the trailer.

To overcome this difficulty, there have been various designs of tow hitches which incorporate some form of keyed lock arrangement to prevent removal of the locking element. Whilst such arrangements have proved effective for reducing the incidence of theft, they may have a number of disadvantages. For example, in some designs, the keyed lock may jut out from the tow hitch at an angle in an ungainly fashion to the extent that it can catch against other objects in the vicinity of the tow hitch. Also, by jutting out at an angle to the direction of travel the lock may readily pick up items of dirt and dust as the towing vehicle and trailer are travelling along dusty highways. Such designs may also be ugly in appearance and unduly heavy because of their construction.

It is an object of the present invention to provide a tow hitch construction which incorporates a lock and which can be configured in an alternative way to currently available tow hitches.

SUMMARY

In a first aspect the invention provides a tow hitch comprising, a housing having a generally hemispherical socket for receiving a tow ball, a handle mountable on the housing having a rod member slidably projecting into the housing and arranged for moving a locking element within the housing between an engaged position at which it holds the tow ball within the socket and a disengaged position where the tow ball is free to move into an out of the socket, a catch member moveable between a holding position wherein it secures the handle against sliding and an open position where the handle is free to slide, and a lock arranged to lock the locking element in the engaged position and to free the locking element for moving to the disengaged position when the lock is unlocked.

Suitably the socket is arranged at the front of the tow hitch. The lock may be located at any suitable position. In some preferred embodiments, the lock is located at the side of the housing. In other embodiments, the lock may be positioned at a location at the rear of the tow hitch on a plane bisecting the tow hitch along its length. In some embodiments, the lock may be positioned above the socket but below the handle. The lock may be arranged so that it sits flush with the housing when it is locked.

The lock may be operated by a conventional key as is known in the art. The lock may be arranged to project into and engage an aperture in the locking element when it is locked and to move out of engagement with the aperture when it is unlocked. The lock comprises a slidable core that engages in a cavity of the locking element, when the lock is locked, and disengages from the cavity when the lock is unlocked.

Suitably, a resilient member is arranged to exert force to move the locking element into the engaged position when the catch member is in the holding position. The resilient member may comprise a spring surrounding the rod member. The spring may sit inside a tubular cavity formed between the locking element and the rod member. Opposite ends of the spring may respectively abut a shoulder formed internally of the housing and a wall formed at the bottom of the tubular cavity.

An adjustment member may extend through the socket. It may be moveable into and out of a hemispherical cavity formed by the socket for receiving the tow ball. It may be screw threaded to allow adjustment.

The catch member may be pivotally mounted on the handle in cooperative relationship with a spring member. The spring member may be arranged to urge the catch member into the holding position. The catch member may have a push pad arranged so that manual pressure on the push pad pivots the catch member out of engagement with a recess formed on the rear face of the housing.

In a second aspect of the present invention, there is provided a tow ball assembly for mounting on a tow bar, the tow bar including an aperture, the tow ball assembly comprising
  a ball member comprising:
    a tow ball;
    a threaded shaft to pass through the aperture in the tow bar to mount the tow ball; and
    at least one hole in the threaded shaft; and
  a nut member comprising:
    an internally threaded aperture, such that the nut member can be tightened on the threaded shaft of the ball member to mount the assembly; and
  a lock having a slidable member that is movable between an unlocked position permitting the nut to be threaded onto the threaded shaft, and a locked position where the slidable member projects into the at least one hole in the threaded shaft to prevent unthreading of the nut member.

Again, the lock may be operated by a key.

Furthermore, the slidable core may slide substantially at a right angle to the threaded shaft to engage and disengage within the at least one hole.

A detailed description of one or more embodiments of the invention is provided below, along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents.

For the purpose of example, numerous specific details are set forth in the following description in order to provide a thorough understanding of the present invention. The present invention may be practiced according to the claims without some or all of these specific details. For the purposes of clarity, technical material that is known in the technical fields related to the invention has not been described in detail so that the present invention is not unnecessarily obscured.

BRIEF DESCRIPTION OF THE DRAWINGS

Embodiments of the invention will now be described with reference to the accompanying drawings wherein.

Figure 1:
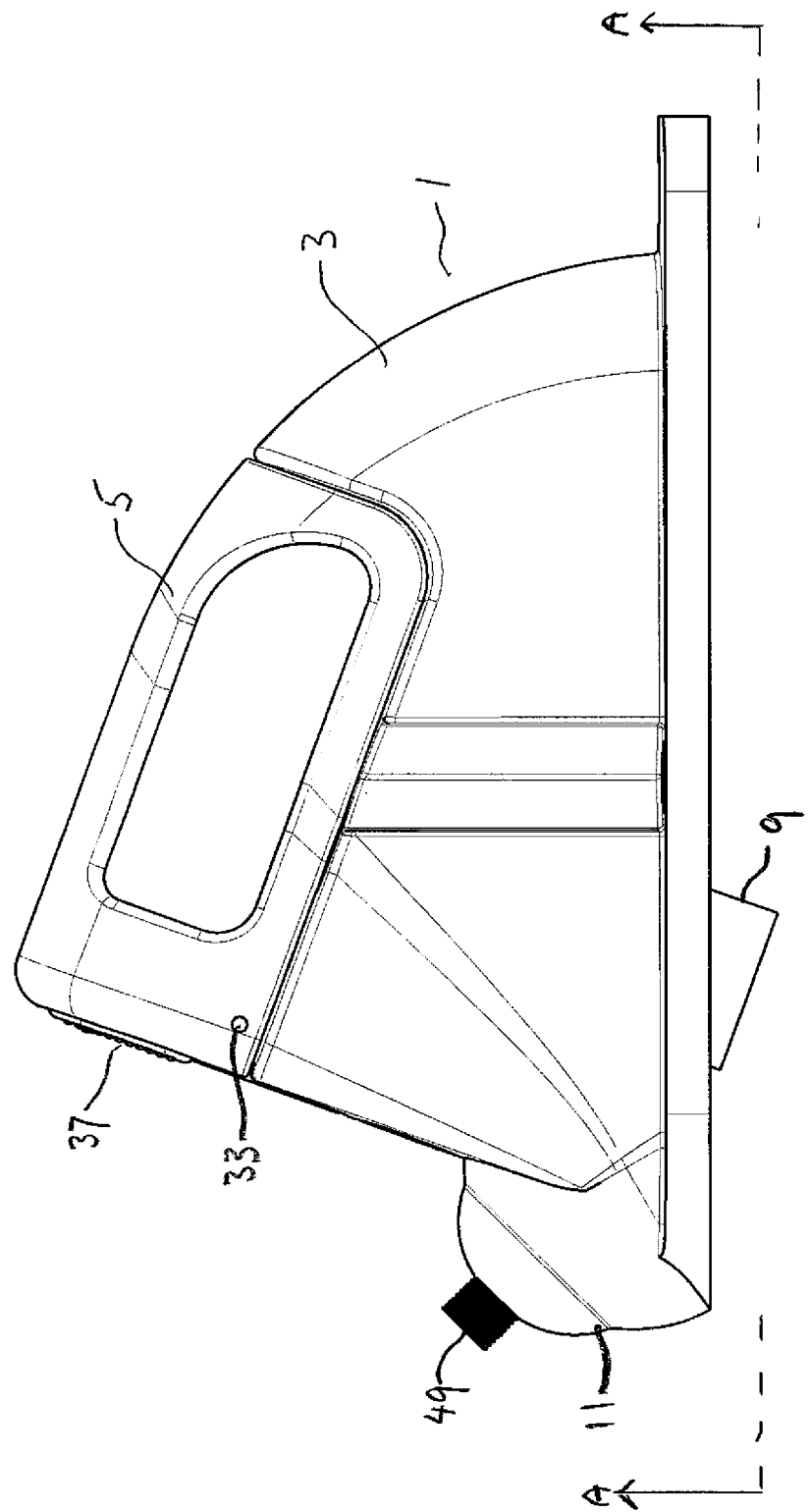
FIG. 1 is an elevational view of a tow hitch constructed in accordance with the invention.
Figure 2:
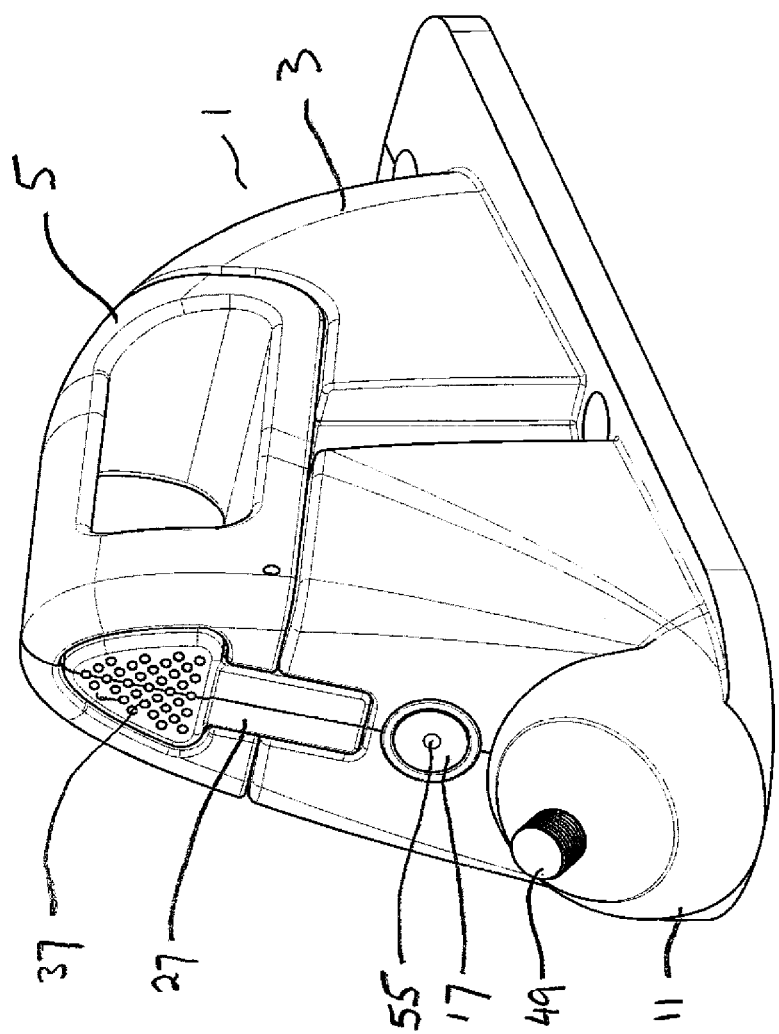
FIG. 2 is an isometric view of the tow hitch of FIG. 1.

The various elements comprising the tow hitch shown in FIGS. 1 to 5 are listed in the following integer list;

INTEGER LIST

1. Tow hitch
3. Housing
5. Handle
7. Rod member
8. Extension
9. Locking element
10. Pin cavity
11. Socket
12. Pin
13. Hemispherical cavity
14. Extension cavity
15. Tow ball
15A. Lockable tow ball
17. Lock
18. Barrel
19. Slidable core
20. Spring means
21. Cavity
23. Grub screw
24. Screw socket
25. Cavity
27. Catch member
29. Flange
31. Recess
33. Pivotal mount
35. Spring
37. Push pad
39. Spring
41. Tubular cavity
42. Cavity
43. Shoulder
45. Profiled edge
47. Ledge
49. Adjustment member
51. Screw socket
53. Pin
55. Key slot
57. Threaded shaft
59. Holes in threaded shaft
61. Nut
63. Key cylinder mount

DETAILED DESCRIPTION

Referring to FIGS. 1 to 5 of the accompanying drawings, there is shown a tow hitch generally designated 1 having a housing 3 and handle 5.

A rod member 7 depends downwardly from the handle and is formed with an extension 8 for purposes to become apparent.

The rod member 7 extends into a tubular cavity 41 formed in a locking element 9. The extension 8 formed at the end of the rod member 7 is received in the extension cavity 14 provided at the bottom of the locking element 9. The extension 8 is secured to the bottom of the locking element by a pin 12 extending through the pin cavity 10.

The locking element 9 is slidable in the cavity 42 formed in the housing so that it can move into and out of engagement with a tow ball 15 located within the hemispherical cavity 13 forming the interior of the socket 11 of the tow hitch.

A lock 17 is intermediately positioned between the socket 11 and handle 5. In the figures, the lock 17 is shown such that a key can be inserted from the front of the housing 3, with the lock projected rearwardly. However, in an alternative embodiment, the lock may be located on a side of the housing 3, projecting transversely across the housing. The exact positioning of the lock 17 may be selected according to user preferences, to give easy access to the lock 17. Wherever the location of the lock, the lock preferably sits flush with the housing 3 of the tow 1 hitch when it is locked, as is shown (for example) in FIG. 4—in this embodiment, the lock 17 is flush with the front face of the housing.

The barrel 18 of the lock is slidably located in the cavity 25 formed in the rear of the housing 3 and is secured in place by the grub screw 23 inserted through the screw socket 24.

Figure 3:
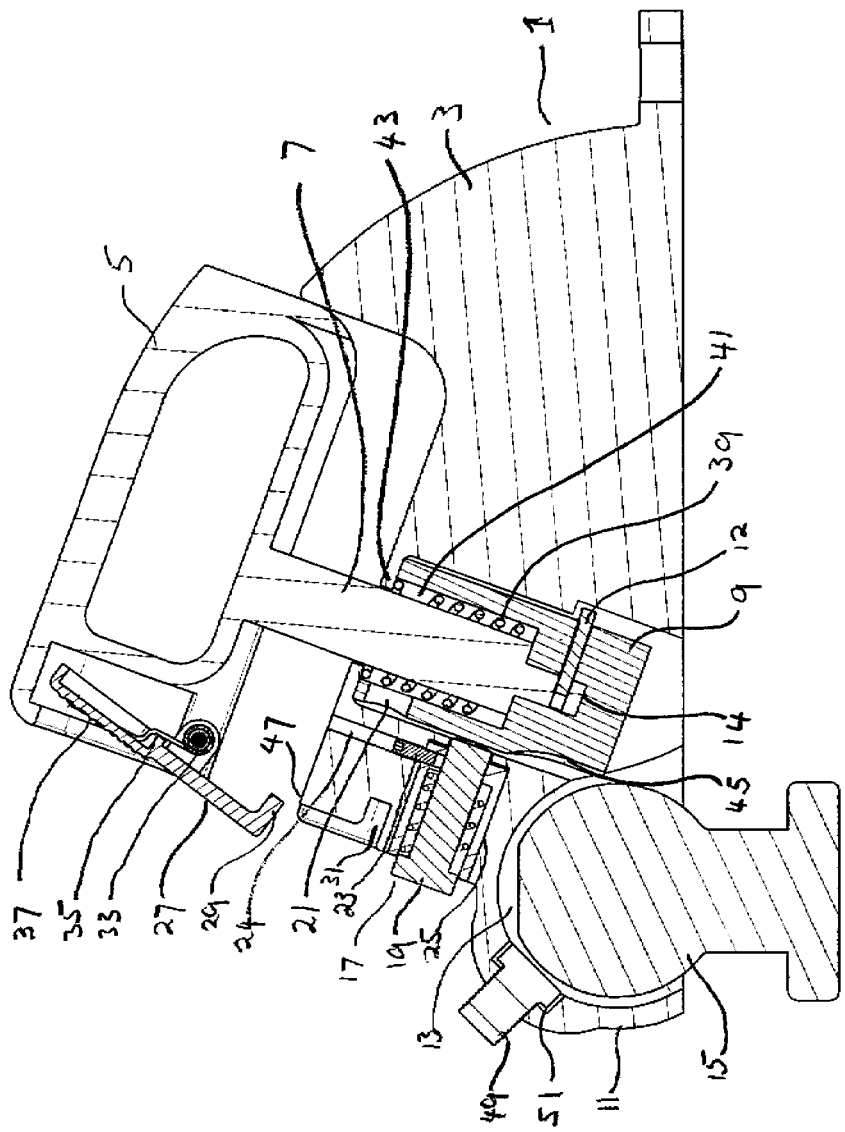
FIG. 3 shows the section A-A of FIG. 1 when it is in the disengaged position.

The lock includes a slidable core 19 which is spring loaded to move to the open position shown in FIG. 3 by the spring means 20 surrounding the slidable core 19.

Figure 4:
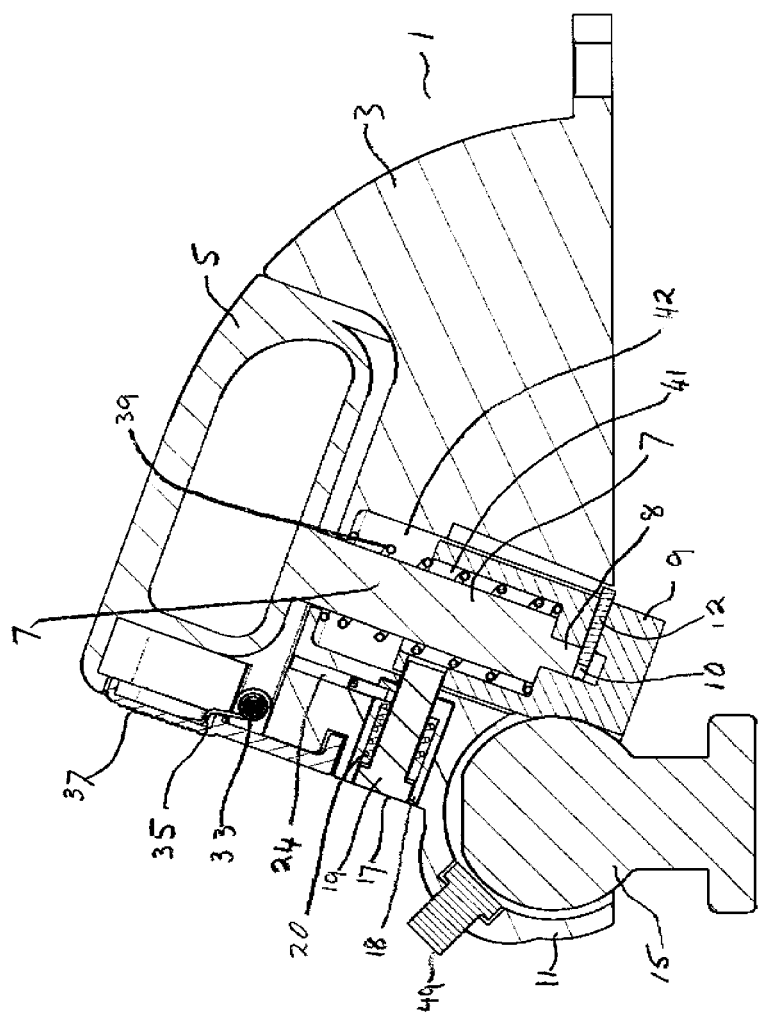
FIG. 4 shows the section A-A of the tow hitch of FIG. 1 when it is in the engaged position.

The inward end of the slidable core 19 is arranged to fit into the cavity 21 formed in the locking element 9 as is shown in FIG. 4.

A catch member 27 formed with a flange 29 at its lower end is pivotally mounted by the pivotal mount 33 on the handle and is resiliently urged by a spring 35 into the closed position shown in FIG. 4. In the closed position, the flange 29 fits into the recess 31 formed in the rear of the housing 3 in order to hold the handle in the downward closed position illustrated in FIG. 4.

The catch member 27 includes a push pad 37 located towards the top of the handle so that it is easily accessible to a thumb or finger when the handle is grasped so that the handle can be pivoted to the open position shown in FIG. 3. The arrangement is such that when the handle is moved to the position shown in FIG. 3 the locking element 9 is moved out of engagement with the tow ball 15.

The housing 3 is formed with a shoulder 43 constructed so as to retain the spring 39 within the cavity 42, the arrangement being such that when the handle is pushed downwardly the locking element 9 is pushed downward under spring loaded pressure to bring the profiled edge 45 of the bottom of the locking element into engagement with the tow ball 15.

Figure 5:
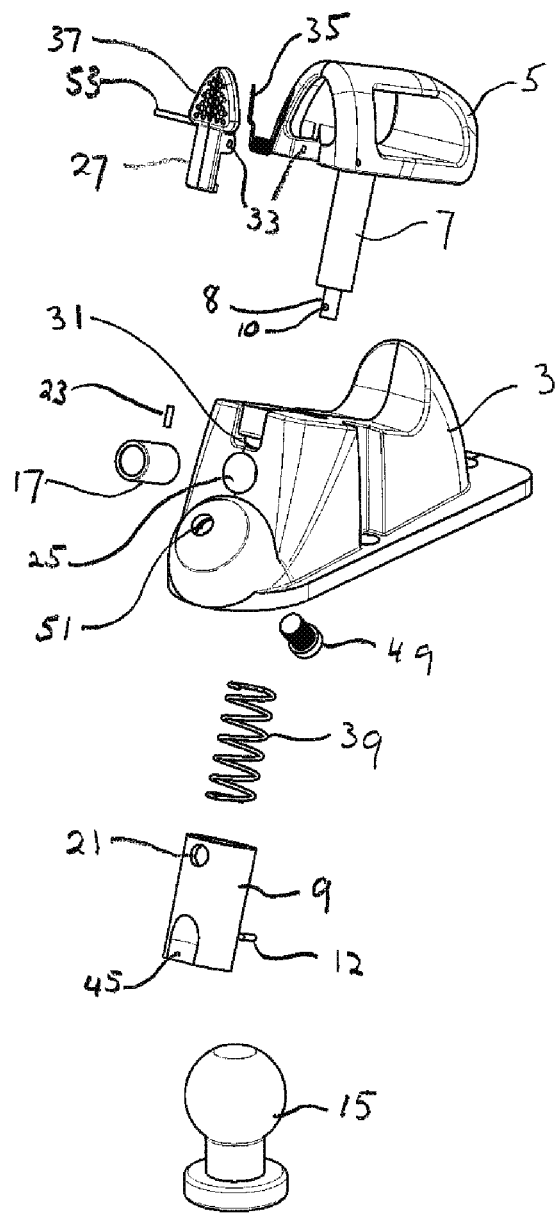
FIG. 5 is an exploded view of the tow hitch of FIG. 1.

A pin 53 is arranged to pass through pivotal mount point 33 formed on the catch member and handle to pivotally secure the catch member 27 to the handle as is shown in FIG. 5.

The housing 3 is formed with a ledge 47 upon which the flange 29 may rest to prevent the handle moving downwardly when the tow hitch is in the open position.

An adjustment member 49 such as a screw threaded bolt may be fitted to a screw socket 51 in the socket 11 as is known in the art for providing a degree of adjustment to cope with slight variations in size of tow balls.

During normal operation, a user will align the tow hitch hemispherical cavity 11 above a tow ball 15 while lowering the tow hitch onto the ball and pressing the push pad 37 so that the tow hitch assumes the configuration in FIG. 3. After lowering the tow ball, the handle is pushed downwardly and the push pad is released so that the locking element 9 engages the tow ball in the manner illustrated in FIG. 4.

The slidable core 19 of the lock 17 can then be pushed inwardly, substantially at right angles to the rod 7 and the locking element 8, so that it engages the cavity 21 to lock the locking element into position. A key inserted into the key slot 55 may be used to lock the tow hitch onto the tow ball in the position illustrated in FIG. 4, so that the slidable core 19 is secured within the cavity 21. In this position, with the lock 17 locked, the tow hitch is not readily removable from the tow ball without use of a key.

Subsequently to remove the tow hitch the lock is unlocked to cause the spring means 20 to retract the slidable core 19 from engagement with the cavity 21. This frees the locking element 9 to slide upwards when the push pad 37 is pressed to disengage the flange 29 from recess 31. The handle 5 is then lifted to move the locking element out of engagement with the tow ball.

The present invention therefore provides additional security over conventional tow hitches, because the trailer or other towed vehicle cannot be removed without unlocking the tow hitch (which requires them to have a key).

Figure 6:
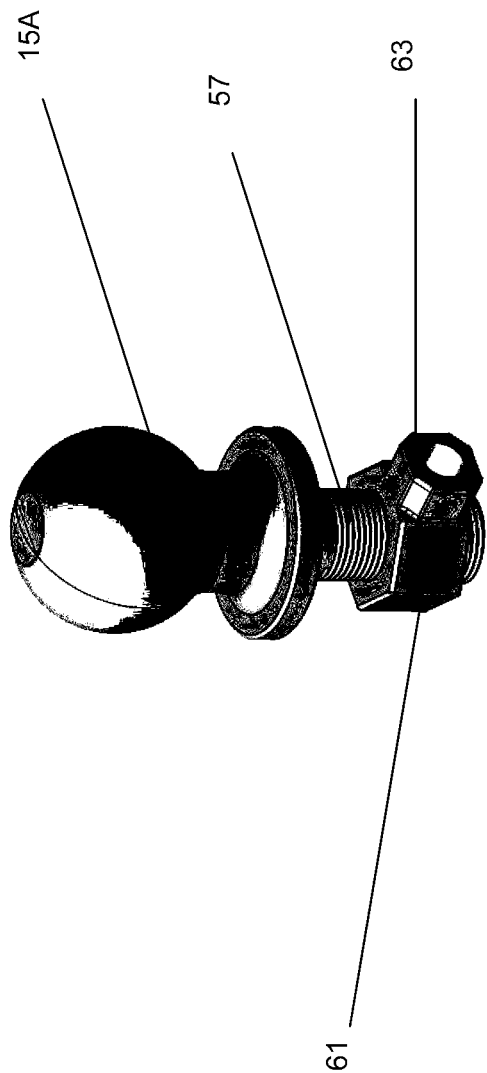
FIG. 6 is an isometric view of a tow ball constructed in accordance with another embodiment of the invention.
Figure 7:
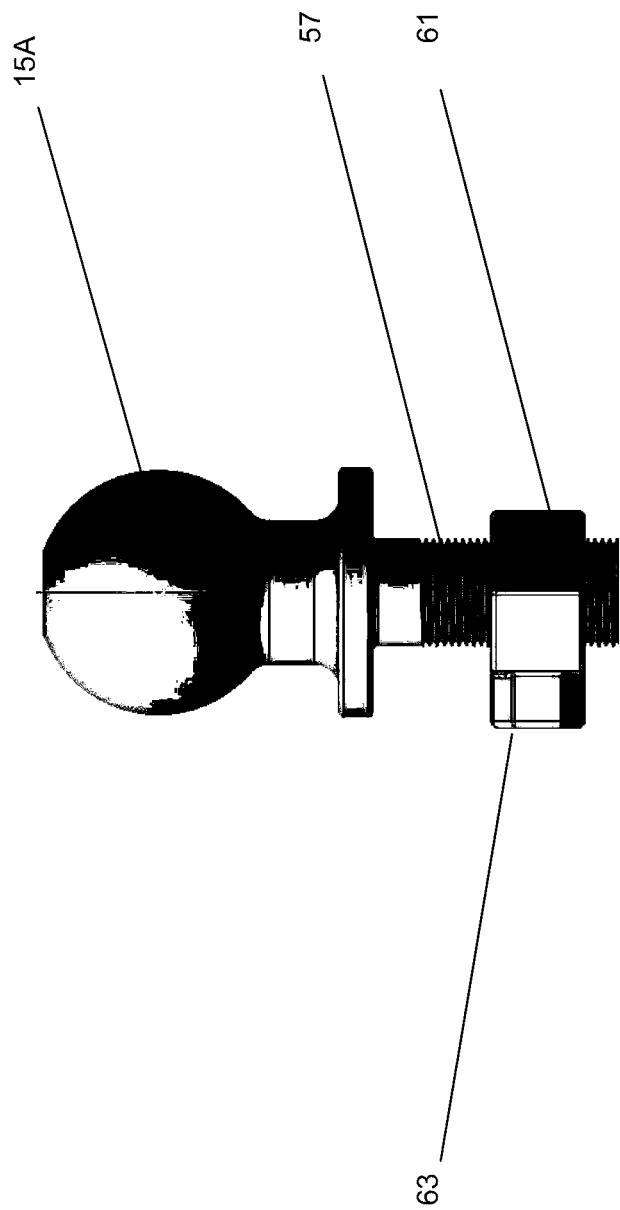
FIG. 7 is an elevational view of the tow ball of FIG. 6.
Figure 8:
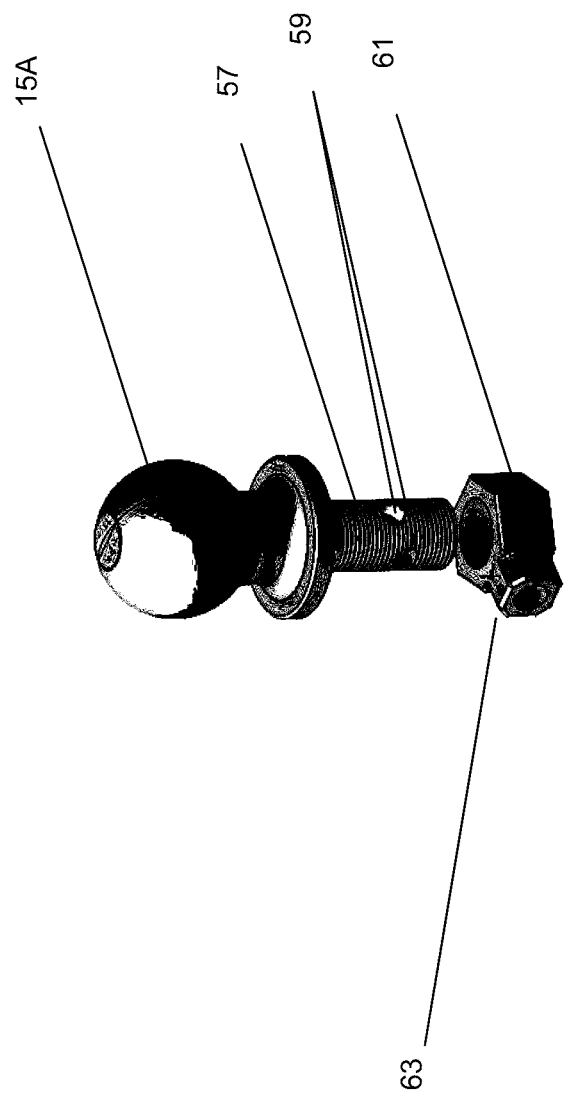
FIG. 8 is an exploded view of the tow ball of FIG. 6.

However, for additional security, the tow ball itself is also lockable to the tow bar, as depicted in FIGS. 6 to 8. The tow ball assembly includes a tow ball member 15A with a threaded shaft 57, which can be passed through an aperture in a tow bar to mount the tow ball 15A. At least one hole 59 is provided in the threaded shaft 57 (which may be below the threads). FIG. 8 depicts two holes 59, in slightly different positions.

Once the shaft 57 is passed through the aperture of a tow bar, a nut member 61 (with internal threads) is screwed onto the threaded shaft 57 from the bottom, to secure the tow ball 15A to the tow bar. The nut member 61 includes a key cylinder mount 63, to receive a key cylinder or other locking mechanism (not shown) for locking the nut 61 in position.

Essentially, the lock mounted in the nut member 61 may be the same lock 17 described above in relation to the tow hitch 1. Once the nut 61 is appropriately positioned, a slidable member (like slidable core 19 of lock 17) can be pushed in, so that it projects into one of the holes 59. The slidable member may secured by locking the key cylinder (which may or may not require a key). In this position, the nut 61 cannot be turned to remove the tow ball 15A. Preferably, the lock is flush with the outer face of nut 61, when locked.

To unlock the nut 61, a key may be turned in the lock to move the slidable member to an unlocked position, permitting the nut to be loosened. The tow ball 15A can then be removed.

Different numbers of holes 59 may be provided in shaft 57. More holes 59 will mean more positions for securing the nut 61, but may adversely affect the strength of the thread and/or the shaft 57. These factors should be considered and balanced according to the requirements and operating stresses of a particular tow ball assembly.

Although preferred forms of the present invention have been described, it will be apparent to persons skilled in the art that modifications can be made to the preferred embodiment described above or that the invention can be embodied in other forms.

Throughout this specification and the claims which follow, unless the context requires otherwise, the word "comprise", and variations such as "comprises" and "comprising", will be understood to imply the inclusion of a stated integer or step or group of integers or steps, but not the exclusion of any other integer or step or group of integers or steps.

The reference in this specification to any prior publication (or information derived from it), or to any matter which is known is not, and should not be taken as an acknowledgment or admission or any form of suggestion that that prior publication (or information derived from it) or known matter forms part of the common general knowledge in the field of endeavour to which this specification relates.

The invention claimed is:

1. A tow hitch comprising,
a housing having a generally hemispherical socket for receiving a tow ball, a handle mountable on the housing having a rod member slidably projecting into the housing and arranged for moving a locking element within the housing between an engaged position at which it holds the tow ball within the socket and a disengaged position where the tow ball is free to move into and out of the socket, a catch member movable between a holding position wherein it secures the handle against sliding and an open position where the handle is free to slide, a lock arranged to lock the locking element in the engaged position when the lock is locked, and to free the locking element for moving to the disengaged position when the lock is unlocked, and
wherein the lock is arranged to project into and engage an aperture in the locking element when it is locked and to move out of engagement with the aperture when it is unlocked.

2. The tow hitch according to claim 1, wherein the lock sits flush with the housing when locked.

3. The tow hitch according to claim 1 comprising an adjustment member extending through the socket and movable into and out of a hemispherical cavity formed by the socket for receiving the tow ball.

4. The tow hitch according to claim 1 wherein the catch member is pivotally mounted on the handle in cooperative relationship with a spring member arranged to urge the catch member into the holding position.

5. The tow hitch according to claim 1 wherein the socket is located in a forward end of the housing and the lock is located at the forward end between the socket and the handle.

6. The tow hitch according to claim 1, wherein the lock is located on a side of the housing.

7. The tow hitch according to claim 1, wherein the lock is operated by a key.

8. A tow hitch comprising:
a housing having a generally hemispherical socket for receiving a tow ball,
a handle mountable on the housing having a rod member slidably projecting into the housing and arranged for moving a locking element within the housing between an engaged position at which it holds the tow ball within the socket and a disengaged position where the tow ball is free to move into and out of the socket, a catch member movable between a holding position wherein it secures the handle against sliding and an open position where the handle is free to slide, and a lock arranged to lock the locking element in the engaged position when the lock is locked, and to free the locking element for moving to the disengaged position when the lock is unlocked, a resilient member arranged to exert force to move the locking element into the engaged position when the catch member is in the holding position, the resilient member comprising a spring surrounding the rod member and arranged so that the spring lies in a tubular cavity in the locking member with opposite ends of the spring respectively abutting a shoulder formed internally of the housing and a wall formed at the bottom of the tubular cavity.

9. A tow hitch comprising:

a housing having a generally hemispherical socket for receiving a tow ball, a handle mountable on the housing having a rod member slidably projecting into the housing and arranged for moving a locking element within the housing between an engaged position at which it holds the tow ball within the socket and a disengaged position where the tow ball is free to move into and out of the socket, a catch member movable between a holding position wherein it secures the handle against sliding and an open position where the handle is free to slide, and a lock arranged to lock the locking element in the engaged position when the lock is locked, and to free the locking element for moving to the disengaged position when the lock is unlocked, wherein the lock comprises a slidable core that projects into and engages in an aperture of the locking element, when the lock is locked, and disengages from the aperture when the lock is unlocked.

10. The tow hitch according to claim 9, wherein the slidable core slides substantially at a right angle to the rod member.

* * * * *